US009138099B2

United States Patent
Dhuper et al.

(10) Patent No.: US 9,138,099 B2
(45) Date of Patent: Sep. 22, 2015

(54) MODULAR FIRE PIT TABLE

(71) Applicants: Sunil Kumar Dhuper, Old Westbury, NY (US); Greg Marler, Rockford, IL (US)

(72) Inventors: Sunil Kumar Dhuper, Old Westbury, NY (US); Greg Marler, Rockford, IL (US)

(73) Assignee: DHUPER, SUNIL KUMAR, Old Westbury, NY (US)

( * ) Notice: Subject to any disclaimer, the term of this patent is extended or adjusted under 35 U.S.C. 154(b) by 446 days.

(21) Appl. No.: 13/632,390

(22) Filed: Oct. 1, 2012

(65) Prior Publication Data

US 2013/0081609 A1    Apr. 4, 2013

Related U.S. Application Data

(60) Provisional application No. 61/541,904, filed on Sep. 30, 2011.

(51) Int. Cl.
*A47J 37/07*     (2006.01)
*A47J 37/04*     (2006.01)

(52) U.S. Cl.
CPC .................. *A47J 37/0781* (2013.01)

(58) Field of Classification Search
CPC . A47B 11/00; A47B 2200/02; A47J 37/0731; A47J 37/0781
USPC .................... 126/25 AA, 511, 519
See application file for complete search history.

(56) References Cited

U.S. PATENT DOCUMENTS

| | | | | |
|---|---|---|---|---|
| 958,672 | A * | 5/1910 | Olson | 108/94 |
| 1,077,218 | A * | 10/1913 | Bryant | 108/94 |
| 1,158,475 | A * | 11/1915 | Fox | 219/218 |
| 2,191,100 | A * | 2/1940 | Starling | 126/33 |
| 3,013,550 | A * | 12/1961 | Murchie | 126/25 AA |
| 3,397,881 | A * | 8/1968 | Hedgecock | 472/14 |
| 3,617,693 | A * | 11/1971 | Shimosawa | 219/218 |
| 4,243,013 | A * | 1/1981 | Goon et al. | 126/43 |
| 5,290,997 | A * | 3/1994 | Lai et al. | 219/218 |
| 5,937,764 | A * | 8/1999 | Olivier | 108/20 |
| 6,065,466 | A * | 5/2000 | Baykal | 126/41 R |
| 6,186,055 | B1 * | 2/2001 | DeMars et al. | 99/340 |
| 7,044,064 | B2 * | 5/2006 | Li | 108/50.12 |
| 7,124,694 | B2 * | 10/2006 | Li | 108/50.12 |
| 2005/0109331 | A1 * | 5/2005 | Chao | 126/25 R |
| 2006/0076006 | A1 * | 4/2006 | Duguay et al. | 126/271.1 |
| 2007/0207429 | A1 * | 9/2007 | Barker | 431/328 |
| 2010/0024661 | A1 * | 2/2010 | Wu | 99/339 |
| 2013/0192474 | A1 * | 8/2013 | Rodriguez Aceves | 99/44 R |

FOREIGN PATENT DOCUMENTS

CN    201135242 Y  * 10/2008
JP    10323288 A   * 12/1998

* cited by examiner

*Primary Examiner* — Jorge Pereiro
(74) *Attorney, Agent, or Firm* — Leason Ellis LLP

(57) ABSTRACT

In one embodiment, a fire pit table apparatus includes a base having a ground contacting portion. The apparatus also includes a table assembly coupled to the base. The table assembly includes a table top for placement of one or more objects. The table top has an opening formed therein. The apparatus also includes a fire bowl assembly that is disposed within the opening of the table top such that the table top surrounds at least a portion of the fire bowl assembly and provides access to the fire bowl assembly. The fire bowl assembly includes a fire bowl and a hot top member that is disposed around the fire bowl. The hot top member includes a planar surface on which one or more objects can be placed, wherein the fire bowl and the hot top member are rotatably coupled to the table assembly to permit rotation of the fire bowl assembly relative to the table assembly.

18 Claims, 12 Drawing Sheets

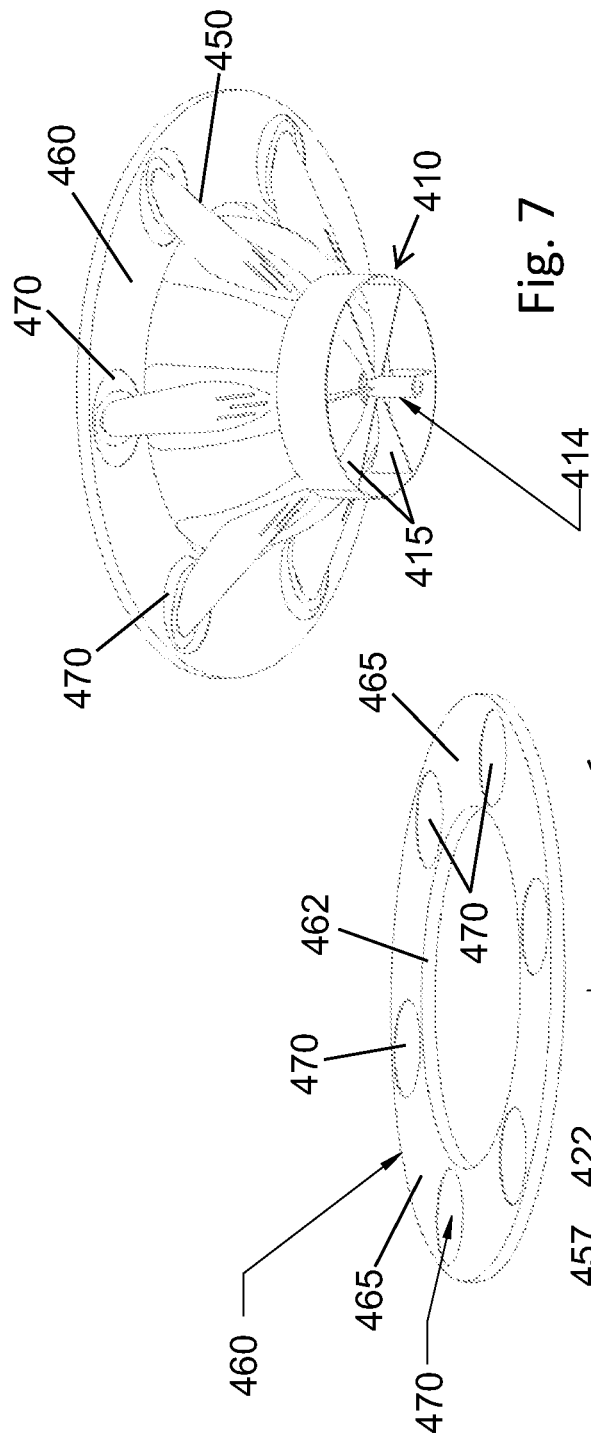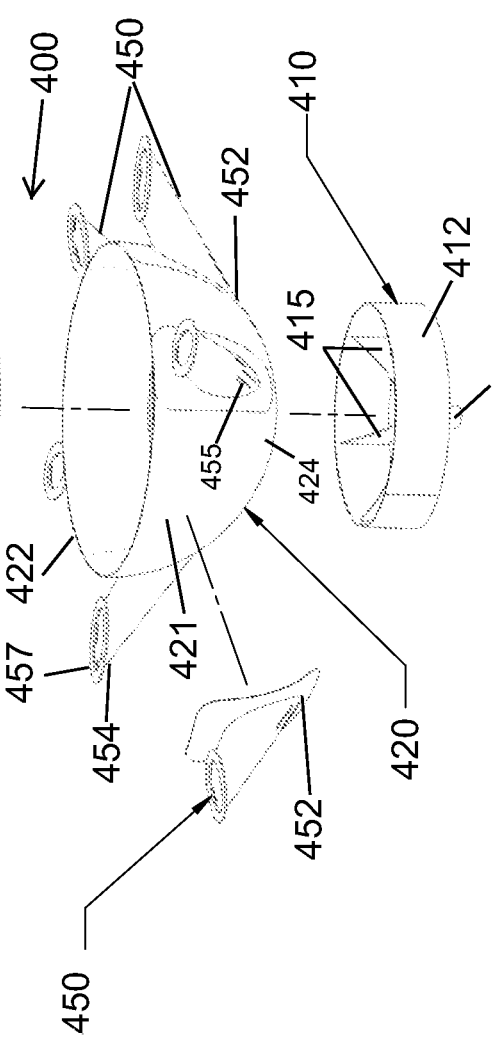

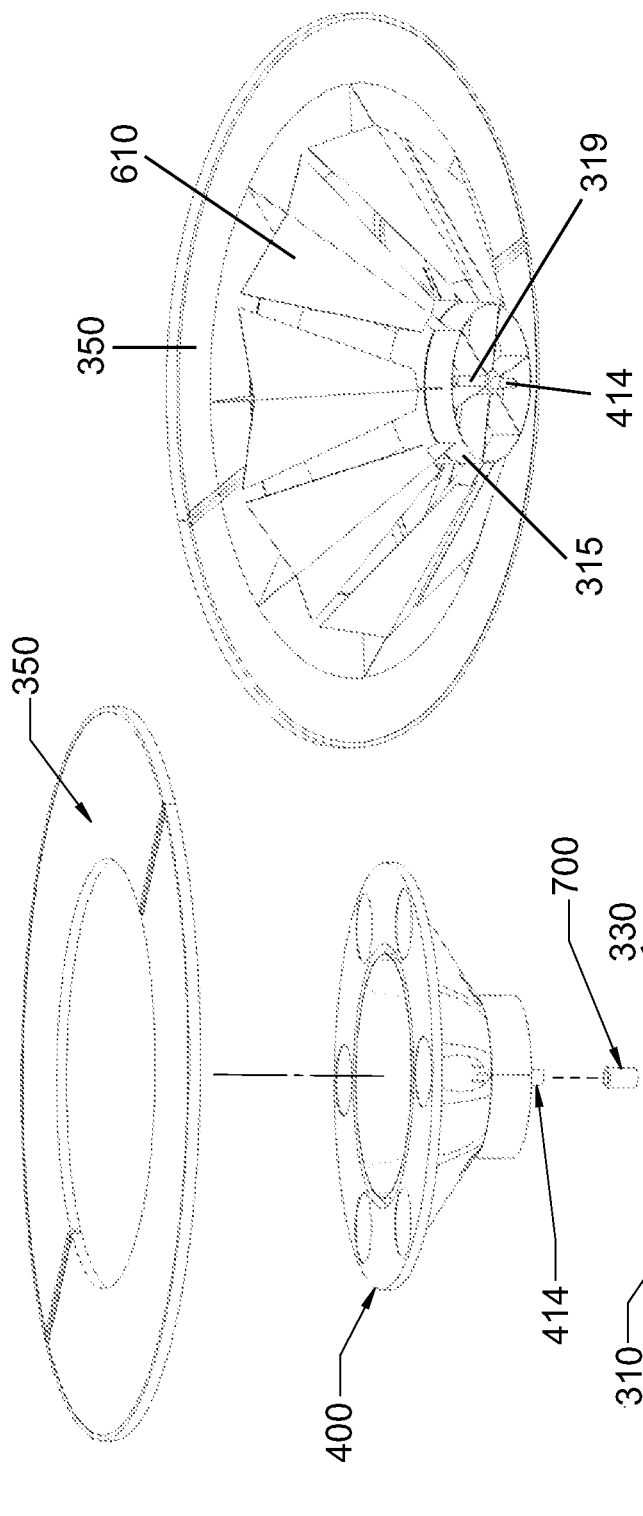

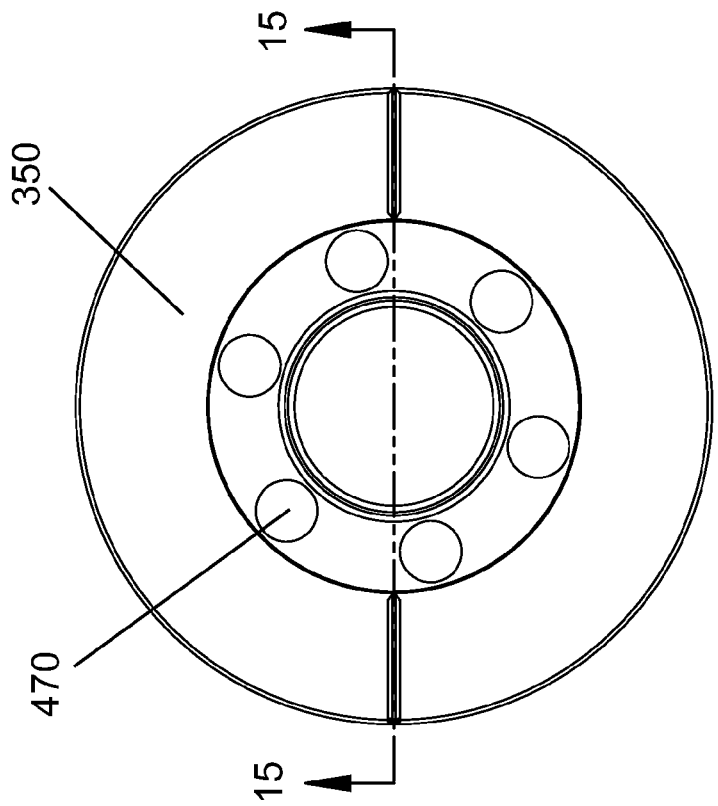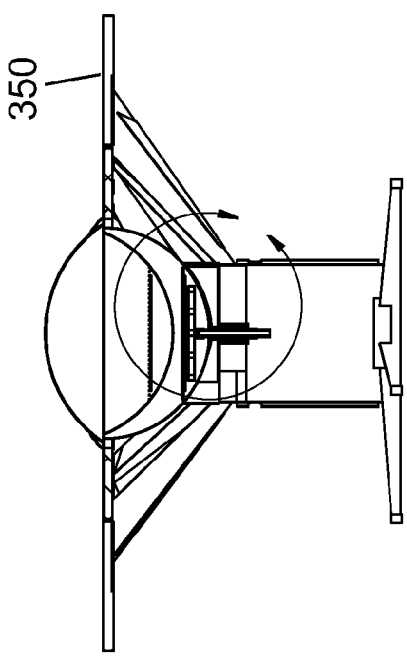
Fig. 14
Fig. 15

MODULAR FIRE PIT TABLE

CROSS-REFERENCE TO RELATED APPLICATION

The present application claims priority to U.S. patent application Ser. No. 61/541,904, filed Sep. 30, 2011, which is hereby incorporated by reference in its entirety.

TECHNICAL FIELD

The present invention relates in general to outdoor heating equipment and in particular, relates to a fire pit table that has an adjustable height and includes a rotatable hot top feature that permits a user to keep food warm by placement thereon.

BACKGROUND

Fire pits have been around for many years and can take any number of different forms including ones that are physically dug into the ground and ones that are pre-fabricated and formed of stone, brick and metal. One common feature of fire pits is that they are designed to contain a fire and prevent it from spreading.

Some fire pits also incorporate a structure that surrounds the fire pit itself. Homeowners enjoy fire pits since they add a warm ambience to an outdoor patio area, etc. Fire pits not only provide warmth but also provide an aesthetic look.

Entertainers and homebodies alike will love a fire pit which adds warm ambience to an outdoor patio area. Fire pits can serve as a warm nucleus for you and your family or guests to gather round and engage in lively conversation, or you can enjoy some alone time in front of the flickering blaze. A fire pit is far more useful than a mono-directional bar heater, as a circular design means that people seated 360 degrees around the pit can enjoy the warmth of a blazing fire.

SUMMARY

In one embodiment, a fire pit table apparatus includes a base having a ground contacting portion. The apparatus also includes a table assembly coupled to the base. The table assembly includes a table top for placement of one or more objects. The table top has an opening formed therein. The apparatus also includes a fire bowl assembly that is disposed within the opening of the table top such that the table top surrounds at least a portion of the fire bowl assembly and provides access to the fire bowl assembly. The fire bowl assembly includes a fire bowl and a hot top member that is disposed around the fire bowl. The hot top member includes a planar surface on which one or more objects can be placed, wherein the fire bowl and the hot top member are rotatably coupled to the table assembly to permit rotation of the fire bowl assembly relative to the table assembly.

In another embodiment, a fire pit table apparatus includes a base including a ground contacting portion and a table assembly coupled to the base. The table assembly includes a table top for placement of one or more objects. The table top has an opening formed therein. The apparatus also includes a fire bowl assembly that is disposed within the opening of the table top such that the table top surrounds at least a portion of the fire bowl assembly and provides access to the fire bowl assembly. The fire bowl assembly includes a main fire bowl and a hot top member that is disposed around the main fire bowl. The hot top member includes a planar surface on which one or more objects can be placed, wherein the main fire bowl and the hot top member are rotatably coupled to the table assembly to permit rotation of the fire bowl assembly relative to the table assembly.

The apparatus also includes a burner assembly and a gas source that is connected to the burner assembly for providing fuel thereto. The burner assembly includes a burner that is disposed within the main fire bowl, the burner being stationary relative to the rotating main fire bowl.

In accordance with this embodiment, a second fire bowl is disposed and supported within the main fire bowl for receiving a combustible material for burning thereof. The second fire bowl rotates with the main fire bowl and is disposed above the burner.

BRIEF DESCRIPTION OF DRAWING FIGURES

FIG. 4A is a detail of a portion of the telescoping mechanism;

FIG. 6 is an exploded perspective view a hot top subassembly;

FIG. 7 is a bottom perspective view the subassembly of FIG. 6 in assembled form;

FIG. 8 is an exploded view of the hot top subassembly and table top;

FIG. 9 is a bottom perspective view of the assembled structure of FIG. 8;

FIG. 14 is a top plan view of the assembled another fire pit table device;

FIG. 15 is a cross-sectional view taken along line 15-15 of FIG. 14; and

DETAILED DESCRIPTION OF CERTAIN EMBODIMENTS

Figure 1:
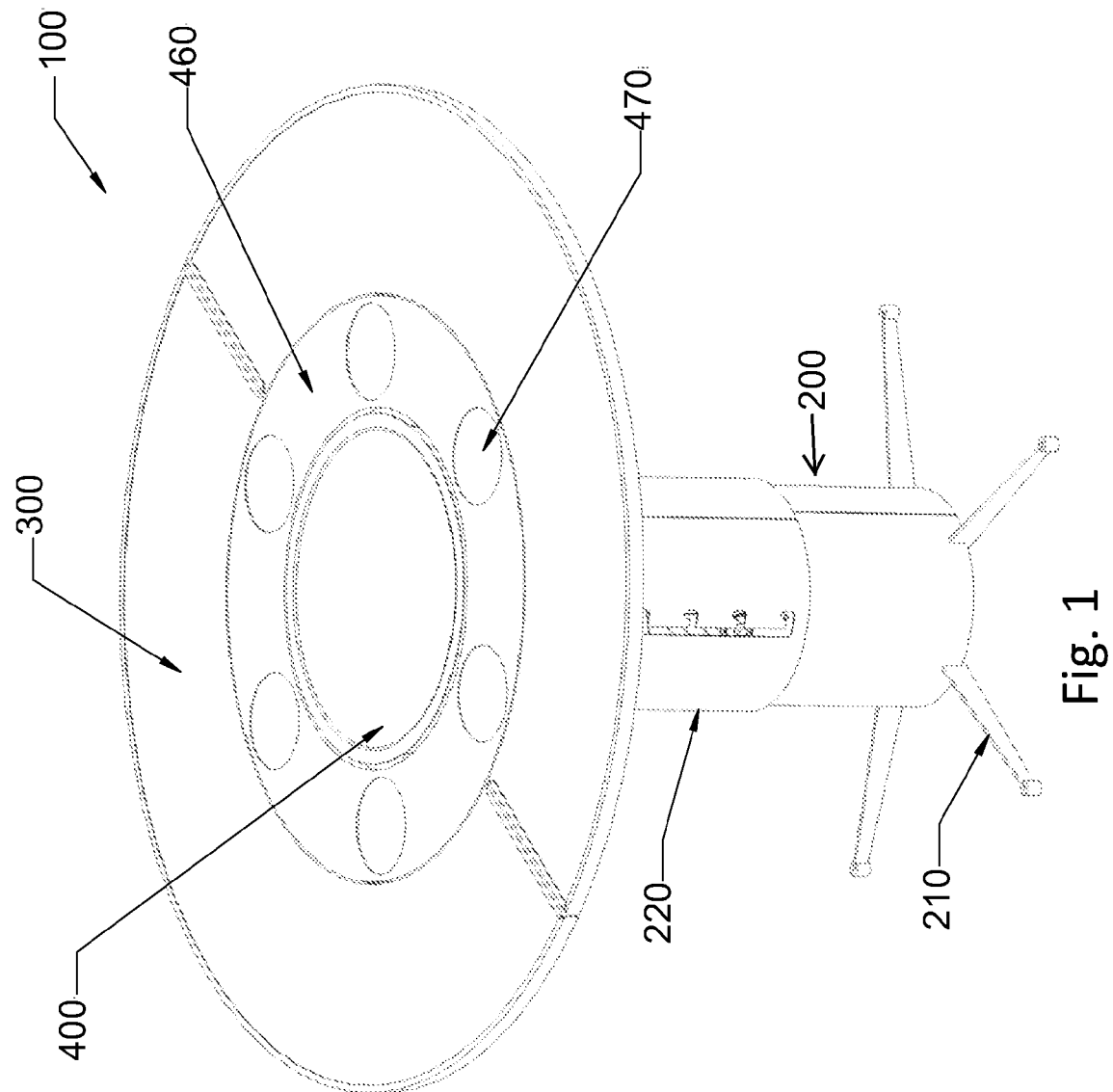
FIG. 1 is a top and side perspective view of a fire pit table device in accordance with one embodiment.

As shown in FIGS. 1-16, a fire pit device 100 in the form of a fire pit table is formed of a number of different components and sub-assemblies that are assembled to form the end product. More specifically, the fire pit device 100 can include a main base (support) assembly 200 which includes a ground contacting element; a main table assembly 300; and a fire bowl assembly 400; as well as a gas source and related equipment 500.

The main base assembly 200 is intended to act as a ground contacting base for the device 100 and supports the table assembly 300 and fire bowl assembly 400. The assembly 200 includes a ground contacting element (member) 210 that rests on the ground and provides a secure base for supporting the weight of the table, etc. In the illustrated embodiment, the member 210 is in the form of a footing weldment that has a center ring portion 212 and a plurality of spokes or feet 214 extending radially outwardly from the ring portion 212. The feet 214 are formed about the circumference of the ring portion 212 and are spaced apart from one another. The feet 214 serve to distribute the weight of the device 100 over an area. As a result, the shape and size of the feet 214 is such that the feet 214 sufficiently contact the ground to provide a stable base for the device 100.

The ring portion 212 has a raised side wall that encircles a floor element 215 that defines a bottom of the ring portion 212. The height of the side wall is intended to capture and hold an object (as described below) that is inserted into the ring portion 212 and seats on the floor element 215.

The ring portion 212 has a circular shape since most gas sources are commercially available in circular shaped tanks; however, the ring portion 212 can have other shapes so long as the shape is complementary to the tank shape.

In one embodiment, the ground contacting member 210 is formed of a metal material and the feet and ring portion are integrally formed as by casting or integrally connected as by welding.

The main base assembly 200 also includes a main elongated support member 220 that is disposed between the table and fire bowl assemblies 300, 400 and the ground contacting member 210. As will be described herein, the elongated support member 220 mates with the table assembly 300 at a first end 222 and the ground contacting member 210 at an opposing second end 224 and serves as a central support (e.g., leg) for the entire device 100.

The second end 224 can mate with the ground contacting member 210 by having a plurality of notches 225 that are shaped and sized to receive the feet 214, thereby locking the support member 220 to the ground contacting member 210. In order words, a secure mechanical fit can be formed between the members 220, 210. This type of mating arrangement between the support member 220 and the member 210 prevents the support member 220 from rotating relative to the member 210.

It will be appreciated that fasteners can be used to provide additional locking between the two members 220, 210.

In the illustrated embodiment, the support member 220 has a cylindrical shape and is hollow and therefore, can be thought of as being an elongated tube. The support member 220 can be formed of different materials including various metals, plastics, etc.

In accordance with one aspect of the invention, the support member 220 has an adjustable length so as to allow the table and fire bowl assemblies 300, 400 to be adjusted to different desired heights relative to the ground depending upon the wishes of the user. In other words, the main vertical support (i.e., the support member 220) is configured so as to allow the fire pit table device 100 to have different heights which can be selected and locked into place by the user depending upon, as described below, if the user wants to have the device 100 to serve as a fire pit in which case the table and fire bowl are set at a low position; or a fire pit table at which the table and fire bowl are set at intermediate position or a fire pit bar table at which the table and fire bowl are set at a high position.

Figure 4:
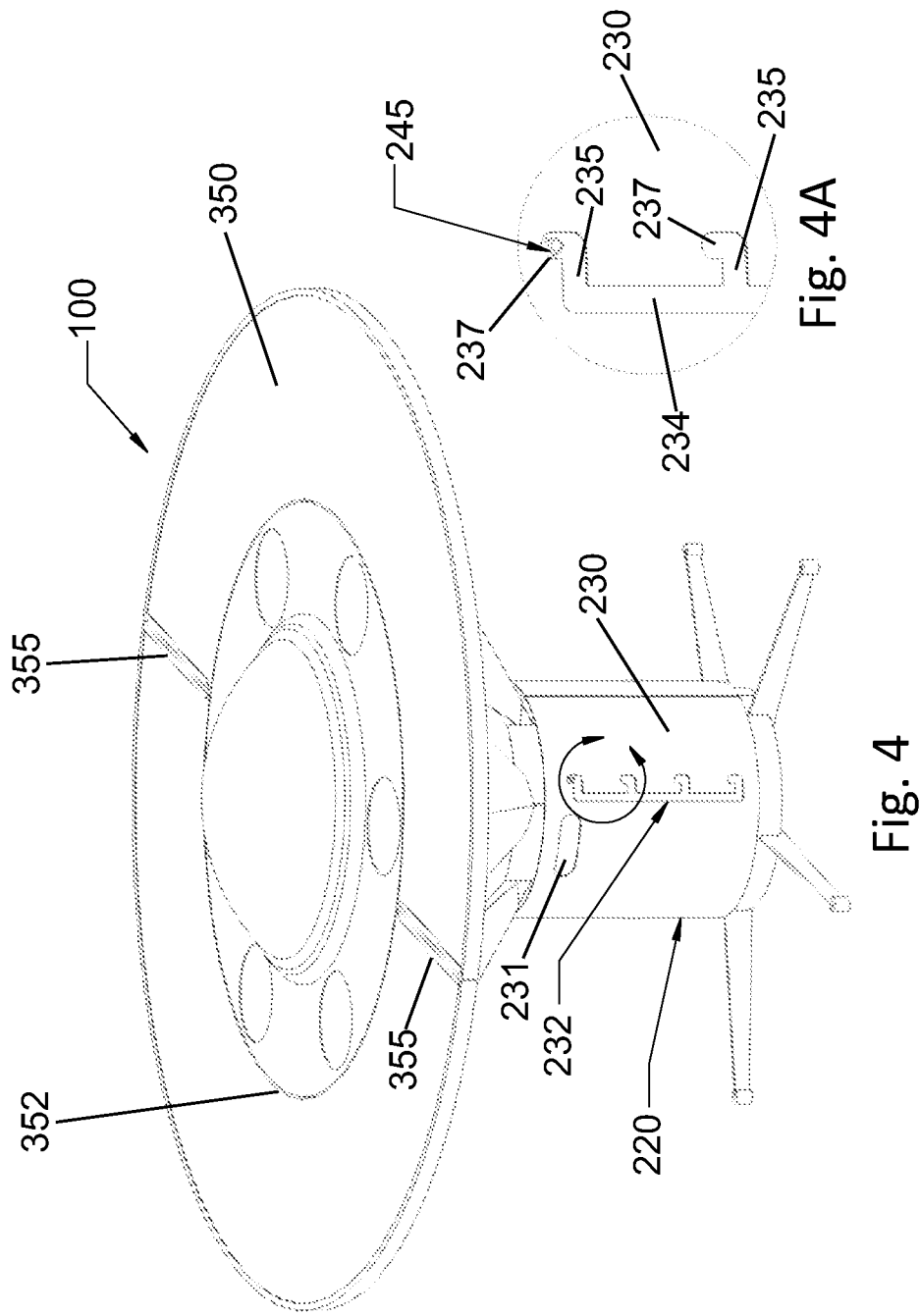
FIG. 4 is a top perspective view of the fire pit table showing an alternative operating mode.
Figure 5:
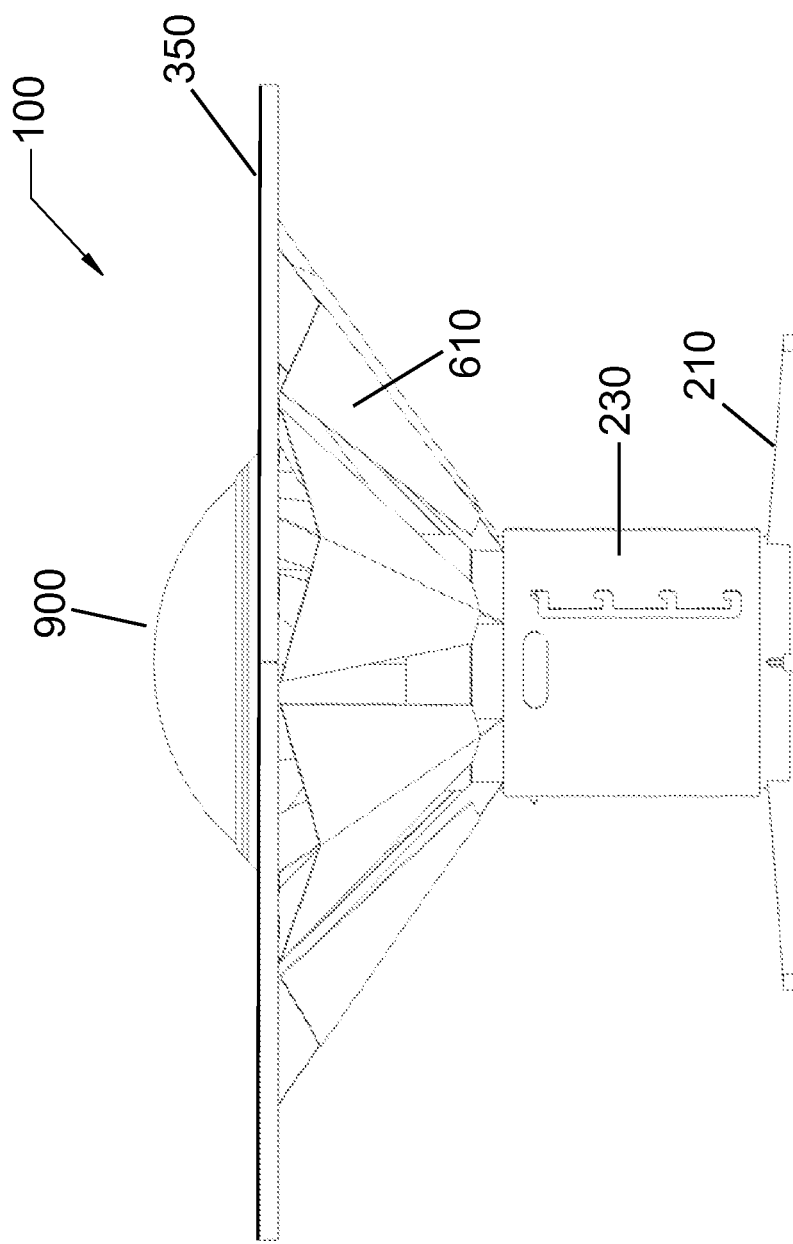
FIG. 5 is a side elevation view of the fire pit table including a safety shield.

In one embodiment, the support member 220 employs a telescoping mechanism to both raise and lower the table and fire bowl assemblies 300, 400. More specifically, FIGS. 4 and 5 show such an embodiment. The support member 220 includes an outer housing 230 (e.g., outer cylindrical shaped housing) and an inner housing 240 (e.g., an inner cylindrical shaped housing) that is received within the outer housing 230.

In the illustrated embodiment, the inner housing 240 defines the second end 224 of the member 220 and includes the notches 225 and the outer housing 230 defines the first end 222 that mates with the table assembly as described below. The inner diameter of the outer housing 230 can be only slightly greater than the outer diameter of the inner housing 240 so as to produce a snug fit between the two.

It will be appreciated that the overall length of the support member 220 is changed by changing the relative positions of the two housings 230, 240. To increase the length of the support member 220, the outer housing 230 is raised relative to the inner housing 240 and conversely, to decrease the height, the outer housing 230 is lowered relative to the inner housing 240.

Any number of different locking mechanisms can be employed to lock the outer housing 230 in a select position relative to the inner housing 240. For example and as shown, the locking mechanism can be in the form of a pin and groove arrangement. As shown, the inner housing 240 includes a pin 245 that extends radially outward from an outer surface of the inner housing 240. The outer housing 230 includes a complementary groove 232 formed therein that receives the pin 245. The groove 232 includes a main vertical section 234 and a plurality of side locking channels 235. Each side locking channel 235 opens into the section 234 at one end and at an opposite end, the channel 235 includes a lock section 237. The lock section 237 is in the form of a small side branch (channel) that extends upwardly from the closed end of the locking channel 235. The lock section 237 extends in a direction parallel to the main vertical section 234.

Each of the side locking channel 235 corresponds to one height setting for the table in that when the pin 245 is inserted into the side locking channel 235 and then inserted into the lock section 237, the outer housing 230 is locked in place relative to the inner housing 240, thereby defining one discrete height setting for the support member 220.

To assist the user in adjusting the height of the support member 220, the outer housing 230 can include one or more openings 231 formed therein (e.g., 180 degrees apart) for defining handle sections to allow the user to grasp the outer housing 230 and move it relative to the inner housing 240. As shown in FIGS. 4 and 5, to adjust the height from one locked position, the user would place his or her hands in the openings 231 and lift slightly up on the outer housing 230 to disengage the pin 245 from the lock section 237 and once the pin 245 in is the side locking channel 235, the outer housing 230 is rotated to cause the pin 245 to reach the vertical section 234 and once there, the outer housing 240 is either raised or lowered relative to the inner housing 240 to position the pin 245 at the desired side locking channel 235. The outer housing 230 is then rotated to cause the pin 245 to travel within the side locking channel 235 to the end and then the outer housing 230 is released, thereby causing the pin 245 to ride into and lock in the lock section 237.

The adjustability of the support member 220 permits the fire pit table device 100 to assume and be locked in one of a plurality of different heights depending upon the desires of the user. For example, the fire pit table device 100 can be placed in the following positions, just to name a few: (1) a low position (fire pit mode) in which the table and fire bowl assembles 300, 400 are generally below seated users; (2) intermediate position in which the table and fire bowl assemblies 300, 400 are oriented at normal table height for seated user; and (3) a high position (bar table height) for either users seated in bar stools or chairs or even standing. Any number of other different positions can be incorporated and the illustrated support member 220 has four distinct height settings.

It will also be understood that the pin and groove formations can be reversed in that the pin can be part of the outer housing 230 and the groove is formed as part of the inner housing 240.

The support member 220 also serves the purpose, in many operating modes, of concealing the gas source and equipment 500. More specifically, the equipment 500 includes in most embodiments a gas tank 510 that holds a gas, such as propane or the like. The gas tank 510 has a lower section 512 that is received within the ring portion 212 such that it seats against and is supported by the floor element 215. Fasteners can also be used to establish the connection between the two. The gas tank 510 is connected to traditional equipment, such as a hose 511, regulator, etc., to deliver the gas to the target location, in this case the fire bowl assembly 400 as described herein.

In low height settings, a reduced size gas tank 510 may be used or the gas tank 510 may be placed at a location outside the support member 220 to allow maximum collapse of the outer housing 230. When placed outside the support member 220, a gas line can be routed from the remote tank through an opening in the support member 220 to the other equipment (e.g., burner) that is part of the fire bowl assembly 400.

The inner housing 240 can include a door or the like to allow insertion of the gas tank 510 therein, thereby permitting placement in the ring portion 212.

As mentioned above, the fire pit device 100 includes a table assembly 300 which represents a portion of the device 100 that the user can readily place objects, such as plates, drinks, etc., at locations sufficiently away from the fire bowl assembly 400. The use can also rest a body part, such as an arm, on the table. The table assembly 300 thus includes a portion that is disposed around (e.g., circumferentially around) the fire bowl assembly 400.

The table assembly 300 includes a main table support member 310 that supports a table top 350 (which is the part on which objects are placed). The table top 350 is attached to the main table support member 310 using conventional techniques including but not limited to using fasteners. The connection between the table top 350 and the main table support member 310 is preferably of a reversible type to allow the parts to be detached from one another for storage, transportation, etc.

The table top 350 can have any number of different shapes and has a central opening 352 formed therein. In the illustrated embodiment, the table top 350 has an annular shape with the central opening 352 having a circular shape. In addition, the table top 350 can be of a type that folds. For example, the table top 350 can have a pair of hinges 355 located 180 degrees apart from one another to allow the table top 350 to be folded in half. This allows easier storage and transportation since the table top 350 is the biggest component of the device 100.

The table top 350 can be formed of any number of different materials including natural material, stone, etc., and synthetic materials that can withstand being proximate heat, etc. The table top 350 is therefore preferably formed of a non-conductive material or a low-conductive material. The table top 350 includes an underside 351 which is attached to the main table support member 310.

The main table support member 310 has a first end 312 and an opposing second end 314, with the first end 312 being attached to the underside 351 of the table top 350 and the second end 314 being attached to the outer housing 230 of the support member 220. The connections between the main table support member 310 and the table top 350 and the outer housing 230 (support member 220) are of a fixed nature such that rotation between the parts is prevented.

The main table support member 310 is a tapered structure in that it is at its widest at the first end 312 and is at its narrowest at the second end 314. The first end 312 is defined by an annular shaped top wall 316 that attached to the underside 351 of the table top 350. The second end 314 is defined by a lower annular shaped base 315 that includes a central opening (e.g., circular shaped opening). The diameter of the annular shaped base 315 is significantly less than the inner diameter of the top wall 316 and therefore, a plurality of struts 330 (support members) are fixedly attached between the base 315 and the top wall 316 to connect the two. The struts 330 can be integrally formed with the top wall 316 and base 315 or they can be fixedly attached to the base 315 and wall 316 using fasteners or the like or they can be fixedly attached at a manufacturing site as by welding. The struts 330 extend outwardly, at an angle, from the base 315 to the top wall 316 and thus represent angled support members. The struts 330 are formed circumferentially about the base 315 and spaced apart from one another.

As best shown in FIG. 8, the base 315 is a spoke-like structure in that within the central opening, a plurality of spokes 318 connect a central hollow boss 319 to the inner surface of the side wall of the base 315. The boss 319 can thus have a tubular shape and the spokes 318 serve to suspend and support the boss 319 within the central opening 317.

Figure 2:
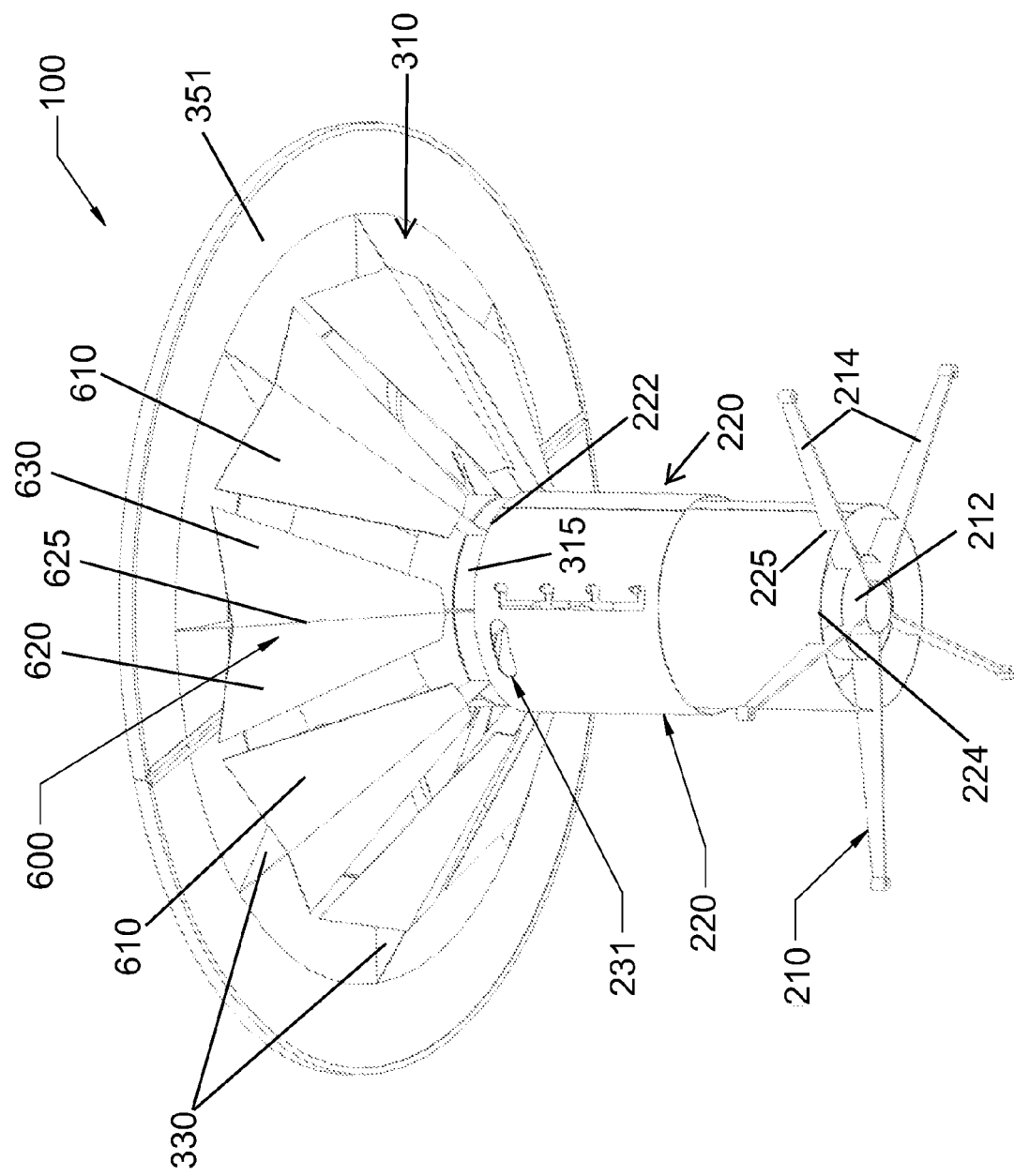
FIG. 2 is a bottom and side perspective view of the fire pit table of FIG. 1.
Figure 3:
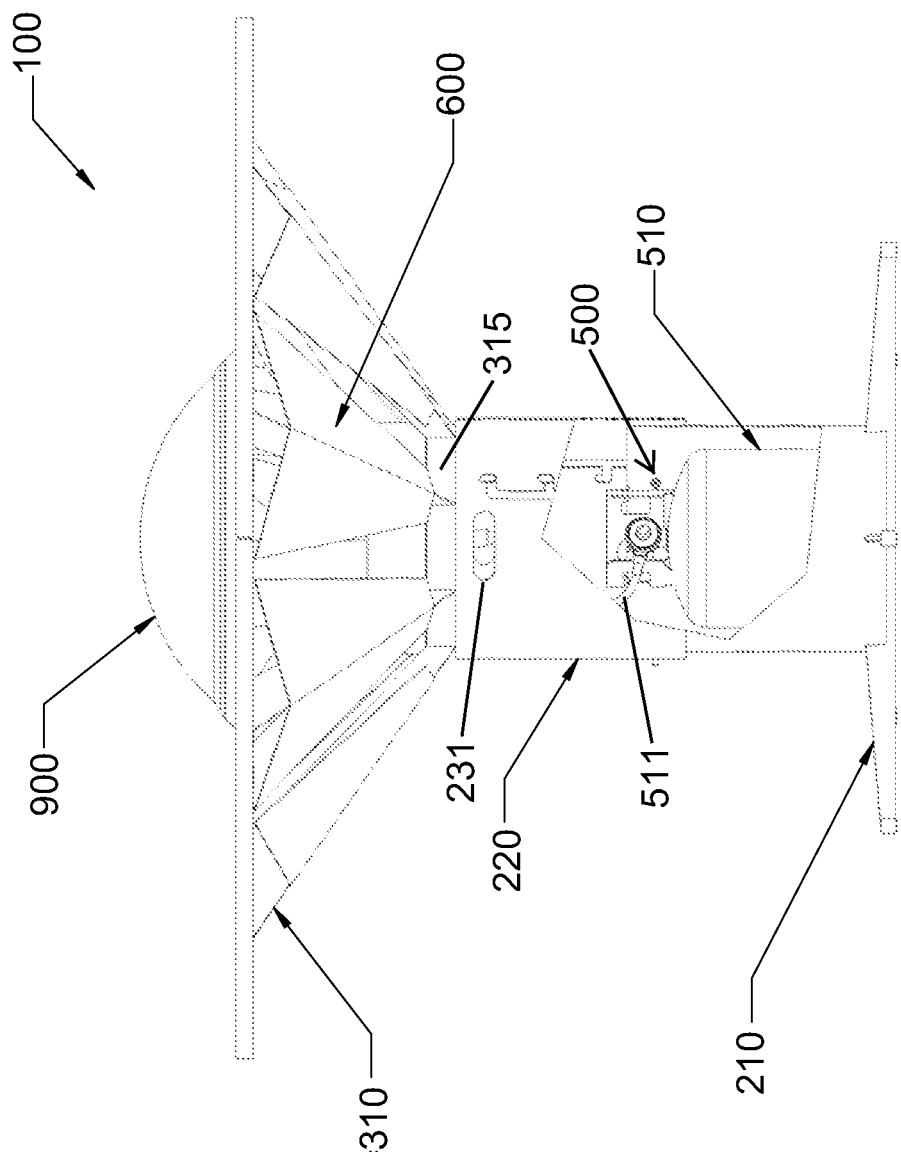
FIG. 3 is a side elevation view in partial break-away of the fire pit table of FIG. 1.

In accordance with another aspect, the main table support member 310 can include a safety (heat) shield 600 to shield users from heat generated within the bowl assembly 400 that is disposed within the main table support member 310. As shown in FIG. 2, the safety shield 600 can be in the form of a series of heat shield panels that are attached to the main table support member 310 so as to provide sufficient coverage and shielding of the user from the generated heat. The heat shield is preferably formed of a non-conductive or low-conductive material that does not heat up due to its proximity to the fire bowl assembly 400. More specifically, the safety shield 600 is defined by a plurality of shield members 610 that have an angled construction so as to be disposed adjacent the struts 330 in a circumferential manner so as to at least significantly or substantially enclose the open spaces between the struts 330.

As shown, each safety shield member 610 can be formed of a first panel section 620 and a second adjacent panel section 630 that are integral to one another and joined along a seam 625. The two panel sections 620, 630 are angled with respect to one another and with relative to the seam 625. In the illustrated embodiment, the safety shield member 610 generally has a V-shape. The attachment between the safety shield member and the main table support member 310 can be accomplished using conventional techniques, including welding, bonding, mechanical attachments, such as the use of fasteners, hooks, etc.

The top edge of the safety shield member 610 can attach to the top wall 316 and the bottom edge can attach to the base 315 or the attachment can be directly and based solely on a connection between the safety shield member 610 and one strut 330. The connection can be of a type that can disengage to allow the shield member 610 to be removed, etc.

In accordance with the present invention, the fire bowl assembly 400 of the present invention is of a type that can rotate relative to the table top 350 and also includes a "hot top" feature. The hot top design is similar to a lazy susan which, as known, is a rotating tray, usually circular, that is placed on the top of a table to aid in moving food to allow different people around the table to reach and retrieve the food.

The fire bowl assembly 400 is discussed as being a "fire bowl" for the simple reason that it contains the active heat (fire) generating components of the device 100 and it is within this assembly 400 that visible flames, etc. can be seen or in some embodiment, a live wood burning fire can be present. It will thus be understood that the fire bowl is merely a concave structure that is designed to withstand high temperatures (such as those generated by burning).

As best shown in FIG. 7, the fire bowl assembly 400 includes a bowl mount 410. The bowl mount 410 is defined by an annular shaped outer wall 412 and a shaft 414 that is centrally located within the hollow interior of the bowl mount 410. The shaft 414 is connected to the outer wall 412 by a plurality of spokes 415 that are spaced apart and circumferentially surround the shaft 414. The shaft 414 is vertically oriented and is maintained as such by spokes 415. The shaft 414 can be a cylindrical shaped hollow shaft that extends below a bottom edge of the outer wall 412 and thus, the shaft 414 defines the bottommost section of the mount 410. As shown, there are open spaces between the spokes 415.

The fire bowl assembly 400 also includes a main fire bowl 420. The bowl 420 is a concave shaped bowl and is defined by a top edge 422 and a bottom wall (surface) 424.

The top edges of the spokes 415 can be contoured (e.g., be curved) so as to present a floor surface that has a complementary shape relative to the bottom surface 424 of the fire bowl 420 and therefore, when the fire bowl 420 is inserted into the mount 410, the bowl 420 is securely supported (cradled) (the bowl 420 does not rock relative to the mount 410).

The bowl 420 is formed of a heat resistive material that can withstand heat and typically is formed of a metal material. The bowl 420 includes an outer surface 421. Along the outer surface 421, a plurality of heat transfer members 450 are disposed. The heat transfer members 450 extend radially outward from the fire bowl 420 and are formed at a predetermined angle. Each heat transfer member 450 has a lower end 452 that is attached to the fire bowl 420 along the outer surface 421 thereof and has an opposing upper end 454. The heat transfer members 450 can have any number of different shapes and are hollow in nature. In the illustrated embodiment, the heat transfer members 450 are in the form of circular tubular shaped members. The heat transfer member 450 has a plurality of vent slots 455 formed therein proximate the lower end 452. At the upper end 454, the heat transfer member 450 can have a flange 457 which can act as a mounting surface (mount/bracket) as described below.

The heat transfer members 450 are disposed circumferentially about the outer surface 421 of the bowl 420. In the illustrated embodiment, there are six (6) evenly spaced heat transfer members 450 and extend downwardly therefrom.

It will also be appreciated that the bowl mount component 410 can be eliminated and instead, the shaft 414 can be integrally formed with the actual fire bowl 420.

In another embodiment, the heat transfer members 450 can be solid rods that are connected at the two ends in the manner described herein.

The fire bowl assembly 400 also includes a hot top component 460. The hot top component 460 has an annular shape defined in part by a central opening 462. The diameter of the opening 462 is selected in view of the diameter of the fire bowl 420 since the opening 462 provides access to the fire bowl 420. The diameters can thus be substantially the same. In addition, the outer dimension of the hot top 460 is selected in view of a dimension of table top 350 since the hot top 460 is disposed within and is surrounded by the table top 350.

The hot top component 460 serves as a hot top in that one or more sections thereof can be heated similar to a hot plate and food can be placed in these sections for warming thereof. In the illustrated embodiment, the hot top component 460 is defined by a first section 465 that is a non-conductive (or limited conductivity) section and by a plurality of discrete conductive sections 470 that are heated relative to the section 465. As shown, the sections 470 can take the form of discrete sections that have an number of different shapes and are spaced apart from one another (with the sections between the discrete sections 470 being the non-conductive sections 465). As shown, the sections 470 can be circular shaped sections located circumferentially about the hot top component 460.

The discrete sections 470 act like individual "hot plates" in that these discrete sections receive heat from the fire pit bowl 420 through several heat transfer mechanisms to provide a region on the table that has elevated temperature for placement of food and the like (i.e., for purposes of keeping the food warm).

The upper ends of the heat transfer elements 450 are in contact with the undersides of the discrete sections 470. Thus, the heat transfer elements 450 are directly connected to and extend between the fire pit bowl 420 and the sections 470. Since there is a direct connection between the fire bit bowl 420 and the sections 470 and each of the bowl 420, elements 450 and sections 470 is formed of a conductive material, heat is transferred from the bowl 420 through the elements 450 to the sections 470 by means of thermal conduction. Thus, thermal conduction provides one means for heating the sections 470. Heat is also delivered to the sections 470 by means of thermal convection. Since the elements 450 are hollow and the vents 455 allow air flow into the hollow interior, air is drawn into the hollow interior of the elements 450 where it is heated as a result of the heat of the bowl 420 and the elements 450. As is well known, warm air rises and thus, the heated air rises to the upper end of the elements 450 which are in direct contact and connection with the sections 470.

Since the elements 450 are formed of a conductive material (such as metal), the elements 450 in and of themselves throw off heat under the table. This heat serves as an additional heat source that is located and directed in a different direction than the heat from the fire pit bowl 420 itself. In other words, since this heat is generated below the table, the elements 450 provide heat that serves to warm up the legs of the user(s). Thermal radiation is thus occurring below the table top 350 and is yet another heat transfer mechanism that is present in the present invention.

Any number of different types of connections can be formed between the upper ends of the elements 450 and the sections 470. For example, the upper ends of the elements 450 can be welded in place with respect to the sections 470 or otherwise bonded thereto. In addition, a mechanical fit can be provided between the upper ends of the elements 450 and the sections 470. For example, fasteners can be used.

In one alternative embodiment, instead of being integrally formed with the fire bowl 420, the heat transfer members 450 can be separate members that are detachably connected to the fire bowl 420. Different techniques can be used to detachably attach the heat transfer members 450 to the fire bowl 420 including but not limited to the use of fasteners, a mechanical fit, etc. Preferably, the type of connection is of a quick release nature in that the user can quickly detach and attach the members 450 at both ends to the corresponding structures. In one embodiment, the fire bowl 420 can include catch (e.g., open bracket) which slidingly receives a protrusion (e.g., flange) formed as part of the member 450 resulting in the member 450 being securely attached to the fire bowl 420. A lock mechanism could also be provided.

This alternative arrangement allows the user to selectively insert/remove the members 450 as desired. For example, one or more sections 470 can be taken "offline" (not heated) by removing the corresponding heat transfer members 450.

It will also be appreciated that the hot top component 460 can be entirely formed of a conductive material and therefore, the entire hot top component 460 can be warmed through use of the heat transfer members 450.

FIG. 1 shows the fire bowl assembly 400 in the completed assembled state. When fully assembled, the fire bowl assembly 400 is disposed within the central opening 352 of the table top 350 in such a manner that the fire bowl assembly 400 is rotatable relative to the table top 350 to allow the fire bowl assembly 400 and in particular, the hot top component 460 thereof, to rotate relative to the table top 350 which surrounds the periphery of the hot top component 460 and defines the peripheral table region of the device 100.

In the assembled position, the top surfaces of the table top 350 and the hot top component 460 are flush with one another.

To accommodate the rotation of the assembly 400 relative to the assembly 300 a bushing 700 or the like can be used. The bushing 700 is inserted into the hollow boss 319 of the base 315 and the bushing receives the lower end of the shaft 414. The shaft 414 can thus rotate relative to the bushing 700 (and relative to the base 315).

Any number of different means can be used to rotate the fire bowl assembly 400 relative to the table assembly 300 (i.e., relative to the table top 350) including the placement of one or more handles (not shown) on the hot top component 460 (e.g., in the non-conductive regions thereof). The user can simply grasp the handles and rotate the hot top component 460 relative to the table top 350 similar to how a lazy susan operates. As the user rotates the hot top component 460, the entire fire bowl assembly 400 rotates about the shaft 414 in the bushing 700. The fire bowl assembly 400 thus rotates within the main table support member 310. The bushing 700 thus controls rotation of the fire bowl assembly 400 within the table.

In terms of fuel to add to the fire bowl table, wood and similar material tend to burn dirty in that a large amount of smoke is produced and embers that can be carried away from the fire pit bowl 420 by wind and the like. This can present a potentially dangerous situation. In contrast, charcoal tends to burn cleaner in that less smoke is generated. The present applicant has discovered that a two stage burning process provides a more enjoyable and safer experience. In particular and according to one embodiment, charcoal is initially used to generate a large amount of heat without excessive smoke, etc., and the present invention includes a supplemental fuel source. For example, the supplemental fuel source can be in the form of a gas (e.g., propane) source that is disposed below the table top 350.

In the illustrated embodiment and in other embodiments, the fuel system 500 is located in the central space below the table top 350 where it is out of reach of people who are seated around the table top 350 as described herein.

The gas source is typically connected to valve regulators via a main conduit (tube 511) that is attached to the gas tank (canister). The regulators are controlled by knobs or the like that allow one to determine how much gas is allowed through the valve to the burner. For each burner there is typically one regulator. Each burner has a series of tiny holes formed in its body through which the gas exits. To have proper ignition, the following three elements are required: gas, oxygen, and spark. The gas is supplied from the gas source and oxygen comes from the air and as described below, the spark comes from a starter.

The starter or igniter is designed to generate a spark and can be in the form of a push-button or rotating knob that creates a spark of electricity to ignite the gas. The starter uses piezo-electricity to generate a nice spark that lights the grill. As is known, certain crystalline materials (like quartz, Rochelle salt and some ceramics) have piezoelectric behavior. When pressure is applied to them, a charge separation is created within the crystal and a voltage across the crystal that is sometimes extremely high. For example, in a starter, the popping noise one hears is a little spring-loaded hammer hitting a crystal and generating thousands of volts across the faces of the crystal.

The burner is where all the actual burning occurs. The burner mixes the gas with oxygen and spreads it out over a large surface area to burn. Each burner is defined by a body that has a plurality of small holes formed therein and the assembly can include multiple burners. Each burner is operatively connected to the starter. For example, each burner can have a pair of electrodes connected to the starter. When the starter's actuator (e.g., a hammer) is tripped, the resulting surge of electricity causes a spark to arc across these electrodes and ignite the gas/oxygen mixture.

It will be appreciated that the size and shape of the burner can be selected in view of the sizes and shapes of the other components.

Figure 11:
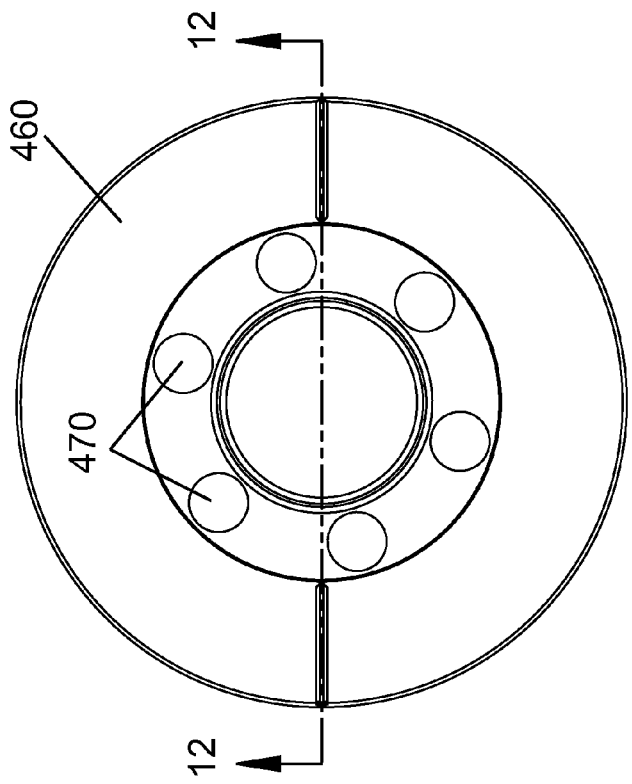
FIG. 11 is a top plan view of the assembled fire pit table device.
Figure 12:
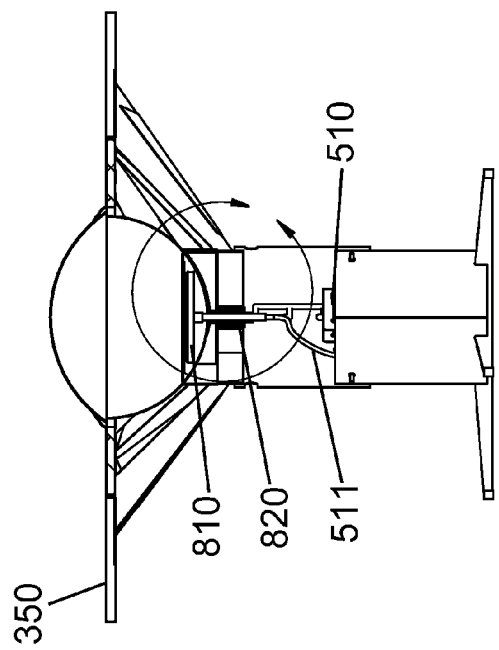
FIG. 12 is a cross-sectional view taken along line 12-12 of FIG. 11.

FIGS. 11-13 and 14-16 illustrate one exemplary burner assembly 800 in accordance with the present invention. As described herein, the fire bowl 420 is designed such that it can be heated using a gas source as opposed to placing a combustible material, such as wood, therein and igniting the same. In this way, the user can easily activate and control the visual fire and heat aspect of the fire bowl. FIG. 12 shows that the gas tank 510 is contained within the support member 220 as described above and the gas line (hose) 511 is routed to the fire bowl assembly 400. However, the manner of supplying gas to the burner assembly 800 needs to accommodate the rotation of the fire bowl 420 relative to the table assembly 300.

Figure 13:
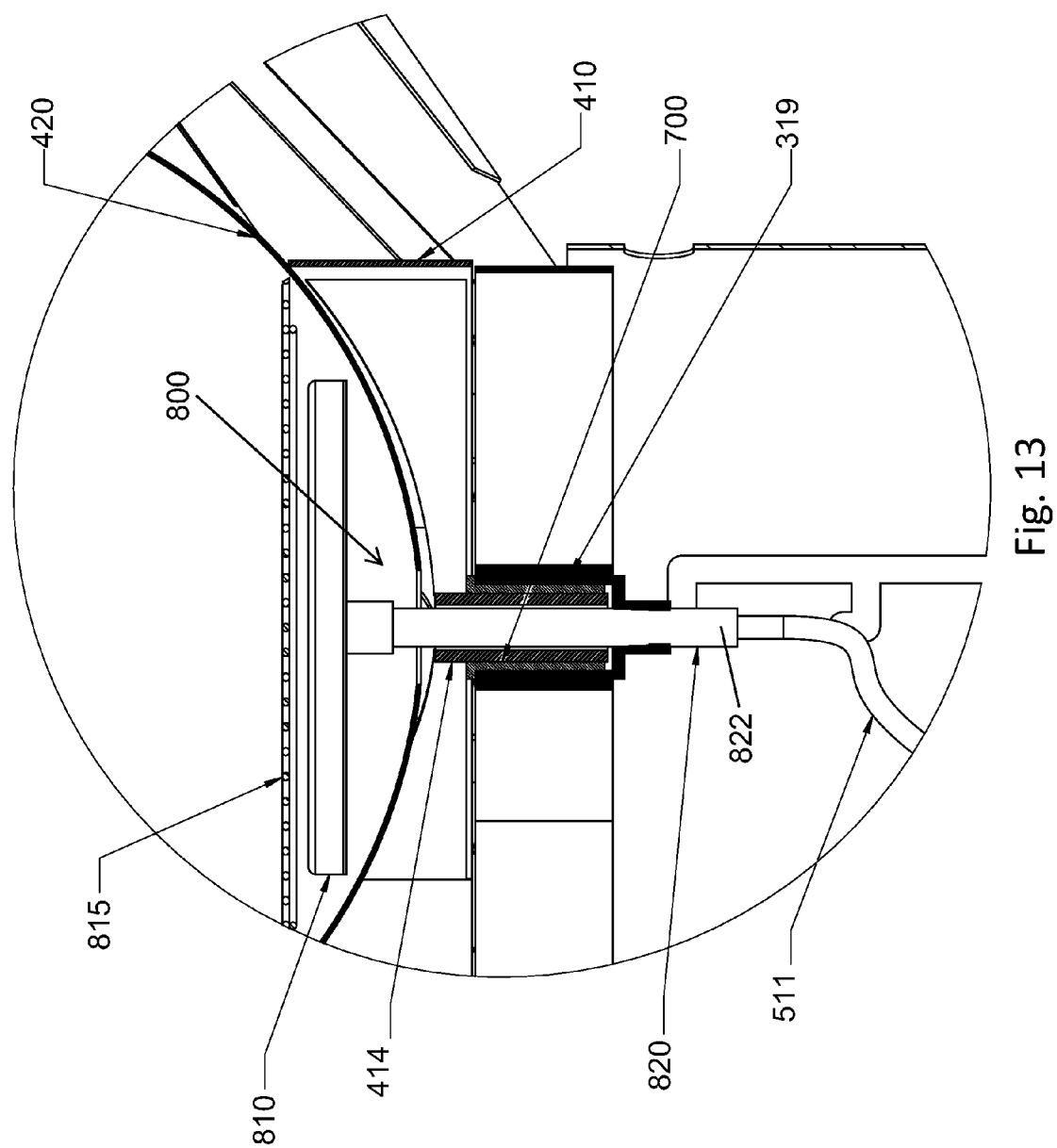
FIG. 13 is an enlarged sectional view of a burner assembly of FIG. 12.

FIGS. 12 and 13 show one manner of providing burner assembly 800 within the fire bowl assembly 400 such that the fire bowl assembly 400 is free to rotate without any adverse implications relative to supplying gas to the burner assembly 800. More specifically, the burner assembly 800 is designed such that the burner assembly 800 is disposed within the hollow interior of the fire bowl 420 but is stationary relative thereto. In other words, the fire bowl 420 rotates about the burner assembly 800 when the user rotates the assembly 400 as by rotating the hot top 460.

The burner assembly 800 includes a burner element 810 that can take any number of different forms including different shapes and also it will be understood that more than one burner element 810 can be disposed within the fire bowl 420. Thus, while FIGS. 11-13 show one burner element 810, it will be understood that multiple burner elements 810 can be incorporated into the device 100 based on the present teachings.

The illustrated burner element 810 has a circular shape and is located centrally within the interior of the bowl 420. On an underside of the burner element 810, a supply tube 820 extends outwardly therefrom. The supply tube 820 is designed to carry the gas to the burner element 810. The supply tube 820 can be oriented perpendicular to the burner element 810. A distal end 822 of the supply tube 820 is sealingly mated to the hose 511 that is connected to the gas tank 510. The supply tube 820 is routed through a center opening that is formed in the bottom of the fire bowl 420 and extends through the hollow shaft 414. As previously mentioned and best shown in FIG. 13, the shaft 414 is disposed within bushing 700 to allow rotation of the shaft 414 relative to the stationary bushing 700. The bushing 700 is held in place within the hollow boss 319. The hollow boss 319 has a bottom opening through which the supply tube 820 extends to allow connection between the distal end 822 of the supply tube 820 and the hose 511. The boss 319 is also a stationary component.

The supply tube 820 and burner element 810 thus do not rotate; however, the shaft 414 which surrounds the supply tube 820 does rotate to permit the fire bowl 420 to rotate.

In this manner, the gas flows through the supply tube 820 from the tank 510 to the burner element 810. The length of the supply tube 820 is selected such that the supply tube 820 is slightly elevated relative to the bottom of the fire bowl 420 and extends completely through the elements 410, 315 to allow distal end 822 to be exposed for connection to the hose 511.

An electric ignition mechanism (not shown) can be incorporated into the device 100 to cause a spark to be generated near the burner element 810 for lighting the gas to create flames (the fire). Alternatively, a user can use an appropriate match or hand-held ignitor to light the fire.

It will be appreciated that while the illustrated embodiment shows only a single support structure in the form of a central leg, there can be more than one support structures spaced around the underside of the table and fire bowl assemblies 300. For example, the fire pit device 100 can have a tripod type arrangement with three tubular structures.

In another embodiment, each local section 470 can include its own integral burner that is connected to the gas source (tank 510). Each of these burners can include a gas line (hose) that connects to a central manifold that is connected to a main gas line from the tank 510. In this embodiment, there can be a valve or the like associated with each burner of the section 470 to allow the user to selectively turn each burner on or off. Thus, the valve can be located along the gas line from the manifold to the burner.

In yet another embodiment, the hot top 460 is formed of removable sections in that the local, discrete sections 370 can be removable relative to the main section 365. Thus, a section 370 that is formed of conductive material can be switched and replaced with a section 370 that is formed of a non-conductive material. This allows the user to define which sections of the hot top 460 are active and are heated surfaces for placing food, etc. The conductive sections 370 can have a different appearance or can include some type of indicia to allow a user to easily determine the sections of the hot top 460 that are active (heated).

In the embodiment in which the individual heated sections 470 include integral burners, each heated section 470 includes a burner that has a connector (e.g., on an underside thereof) which mates with a complementary connector that is part of a gas line (e.g., gas tube) to form a sealed connection between the two. The connection is preferably of a quick release type to allow the discrete heated section 470 to be detached from the gas source. As mentioned herein, the system can be of the type in which the discrete heated sections can be removed from the hot top 460 and be replaced by a non-conductive (non-heated) section 470. When a non-conductive section 470 is used, the section 470 can include no connector or a plug that seals the gas source and preferably, when a non-conductive section 470 is used, a valve or the like can be used to selectively shut off the gas supply to the burner that is contained in section 470.

The gas lines to the burners that are associated with the sections 470 can be routed using any different means. For example, the gas lines can be routed along either the gas transfer members 450 or the struts 330.

A grate or the like 815 can be placed over the burner 815.

Figure 10:
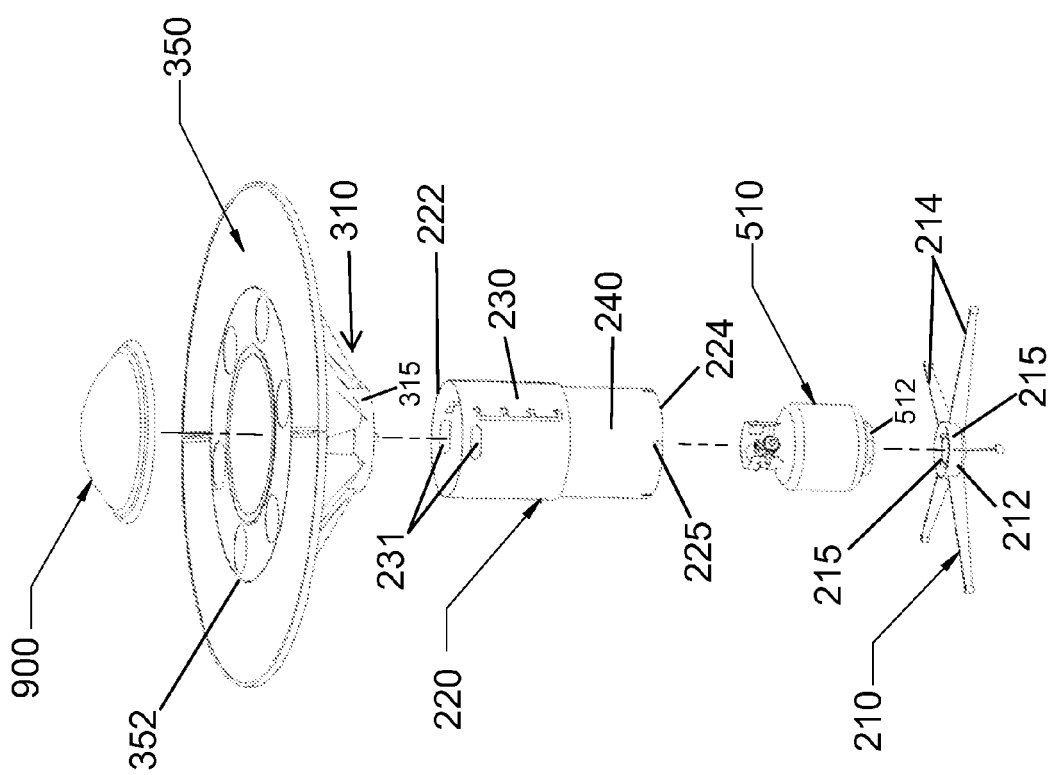
FIG. 10 is an exploded perspective view of the components that form the final assembled fire pit device.

FIG. 10 shows a suppression cover (screen) 900 that can be placed on the fire bowl 420. The cover 900 is formed of a mesh material, such as a metal mesh that contains ash and live embers, etc. The cover 900 can include a handle that allows the cover 900 to be easily placed on the fire bowl 420. The screen 900 can be a dome shaped screen that is disposed over the flames in the fire pit bowl 420. The screen is thus formed of a suitable material, such as metal, that is placed over the open flame/fire to prevent accidental touching and prevent hot, potentially dangerous embers from escaping the fire pit area.

In accordance with the present invention, a modular fire pit table is formed of a number of different components including a fire pit bowl 420 and a table structure (assembly) 300 that receives the fire pit bowl 420.

The fire pit bowl 420 includes a base section which as a bowl form and can include a peripheral flange that extends circumferentially about the bowl. The bowl 420 can be formed of any number of suitable materials including but not limited to metals, ceramics, etc. In accordance with one embodiment of the present invention, the bowl 420 is formed of a conductive material. The shape and size of the fire pit bowl 420 can vary depending upon the particular application. For example, the fire pit bowl 420 can have a circular shape, a square shape, etc. Circular shaped bowls 420 tend to be the more popular shape. The relative dimensions of the flange relative to the base section can also vary; however, the flange should be of sufficient size to permit the fire pit bowl 420 to be easily transported and also allows the bowl 420 to be more easily supported.

In one embodiment, the fire pit bowl 420 can be of a type that has a substantially solid bottom to receive and contain fire burning material, such as charcoal, wood, synthetic burning material. In addition, the fire pit bowl 420 can include one or more openings on the bottom of the bowl 420. These openings can include a means for removing ashes and the like and as described below with respect to another embodiment, one or more openings can be formed to provide a means for introducing a supplemental fuel source.

In accordance with one embodiment of the present invention, the table assembly 300 is of a modular construction and provides a number of features that are described below. In particular and according to one feature of the table assembly 300, the table assembly 300 is of an adjustable height. It will also be appreciated that the table assembly 300 and its components are formed of a suitable material that permits the intended application to be accomplished. For example, the table assembly 300 can be formed of a light material that is heat resistant given its close proximity to the fire pit bowl 200. Suitable materials for the table include but are not limited to treated wood, wood, metal, treated plastic, etc. In addition, other materials, including natural materials, tiles, etc. are possible; however, these materials may increase the overall weight of the table.

However, unlike conventional fire pit table-like structures, the present invention is lighter weight, adjustable and can be easily stored by being folded up, etc.

Fire pits are typically used as night and therefore, an adjustable table structure allows the table top 350 to be set at a number of different heights that allow the table top 350 to be used in different ways. For example, in a first setting, the table top 350 can have a height of about 15 inches to provide a low table about which people can sit and place drinks the like on the table surface. In a second setting, the table top 350 has a height of about 30 inches and serves as a traditional dinner table about which people can sit and place food in front of them. In yet a third setting, the table top 350 can be raised to 42 inches so as to present a bar table structure about which people can stand and place drinks/food.

In the illustrated embodiment, the table top 350 has a circular shape; however, as mentioned above, it can be formed to have other shapes.

In yet another aspect, the table top 350 can be of a collapsible type so as to allow storage thereof. The table top 350 can be formed of different sections that are coupled to one another in an interleaved manner in that the sections of the table top 350 can be interleaved sections that mate together to form the assembled complete table top 350.

Figure 16:
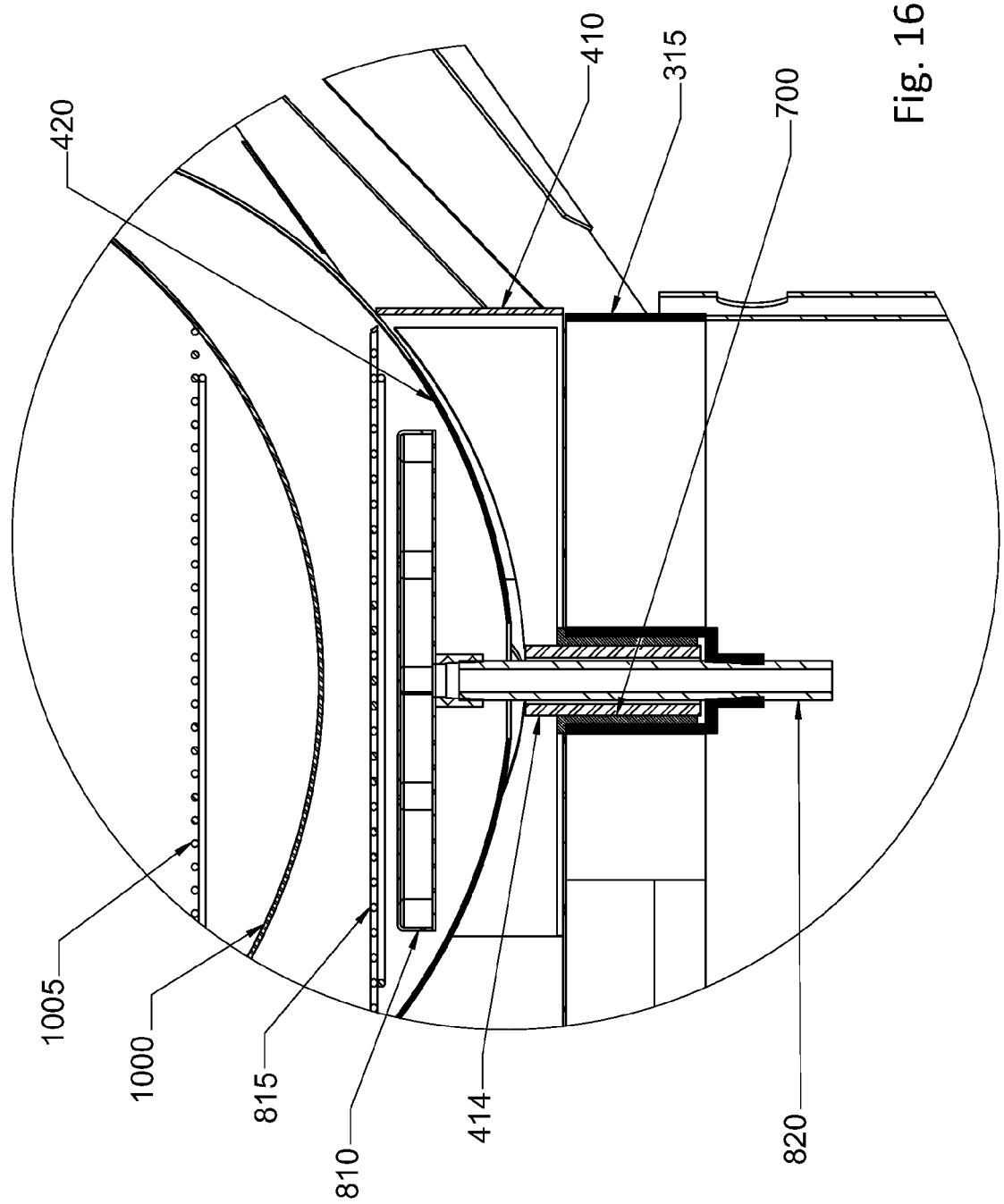
FIG. 16 is an enlarged sectional view of a burner assembly of FIG. 15.

As shown in FIGS. 14-16, the device 100 can be constructed such that it permits an additional supplemental heat source to be used in addition to the gas heat source that the connected to the burner assembly 800. More specifically, the user can augment the gas generated heat by using a natural heat source, such as combustion of wood. In this embodiment, a second fire bowl 1000 is used and is constructed to be received within the main fire bowl 420 and be disposed above the burner 810. The second fire bowl 1000 can be supported by structures (e.g., tabs, hooks, etc.) that are part of the main fire bowl 420 such that the second fire bowl 1000 rests on and is supported by the main fire bowl 420. The second fire bowl 1000 is elevated relative to the bottom of the main fire bowl 420 and is elevated relative to the burner 810 and grate 815.

The second fire bowl 1000 is intended to receive combustible material, such as wood, synthetic logs, etc., for burning to produce a traditional wood burning experience. Thus, the device 100 in this embodiment offers a dual burning experience in that the user can generate flames/heat via the gas source using the burner 810 and then the user can also burn combustible material in the second fire bowl 1000 to provide a different flame/heating experience.

The second fire bowl 1000 can include its own grating 1005 to allow the combustible material to be placed thereon. When not in use, the second fire bowl 1000 can be removed.

Since the second fire bowl 1000 is coupled directly to the main fire bowl 420, the second fire bowl 1000 also rotates (relative to the table assembly 300) as part of the fire bowl assembly 400.

In accordance with another embodiment of the present invention, the fire pit bowl 420 is stationary (non-rotatable) relative to the table assembly 300 and is formed such that it integrally incorporates the gas flow into its design. In other words, a bottom surface of the fire pit bowl 420 can include one more connectors for attaching to the fire pit bowl 420 to a gas source (such as tank 510). These connectors can be integral to the fire pit bowl 420. Thus, different fire bit bowls with different gas flow patterns can be used with the same table. In warmer weather, the fire pit bowl can be selected that has less burners and in colder weather, the fire pit bowl with more burners can be chosen. The user simply swaps the fire pit bowls and hooks the chosen one up to the gas source. Customization is thus provided that is not available in traditional fire pits.

The starter and burner can be integrally disposed within the base section of the fire pit bowl 420. For example, a center portion of the base section can be at least substantially solid and provide a support surface (floor) for the solid fuel material, such as charcoal. Disposed about the center portion can be one or more recessed tracks or the like into which the burner(s) is laid. For example, each burner can be an arcuate shaped burner that is disposed within the fire pit bowl 420 in a surrounding location relative to the center portion of the fire pit bowl 420.

The burner is designed to provide not only additional heat but also provides a visual ambience in that it generates a flame which is pleasing to those seated around the table.

It will also be appreciated that the integral supplemental gas structure can be formed in the center of the fire pit bowl 420 with the solid fuel, such as charcoal, disposed therearound. In addition, one will appreciate that the floor of the fire pit bowl 420 can include a grate or the like on which the solid fuel sits and the supplemental gas fuel structure (e.g., burner) can be recessed and disposed below the grate. In addition, any of the fire pit bowl described herein can include a divider, such as a raised ridge or the like, can serve to separate the solid fuel source from the supplemental fuel.

By incorporating a supplemental gas source, the fire pit not only provides warmth using the solid fuel source, such as charcoal, but it also provide the ambience of real firewood fire by having flames generated by the supplemental gas source which does not produce unwanted smoke.

Other accessories include the use of a grill plate in the fire pit bowl 420 to provide a BBQ experience.

In accordance with one aspect of the present invention, the fire pit bowl 420 can be formed to include integral burners in any number of different shapes including but not limited to spiral, arcuate, square, triangular, etc. As discussed, the location of the solid fuel source (charcoal, etc.) and the gas source can be varied within the fire pit bowl 420.

Any number of different materials can be used so long as they are suitable for the intended application and heat resistant.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A fire pit table apparatus comprising:
a base including a ground contacting portion;
a table assembly coupled to the base, the table assembly including a table top for placement of one or more objects, the table top having an opening formed therein; and
a fire bowl assembly that is disposed within the opening of the table top such that the table top surrounds at least a portion of the fire bowl assembly and provides access to the fire bowl assembly, the fire bowl assembly including a fire bowl and a hot top member that is disposed around the fire bowl, the hot top member including a planar surface on which one or more objects can be placed, wherein the fire bowl and the hot top member are rotatably coupled to the table assembly to permit rotation of the fire bowl assembly relative to the table assembly;
wherein the table assembly includes a base member and a vertical support member coupled to the base member and coupled to the table assembly;
wherein the base member includes a center portion that is configured to receive a gas tank and a plurality of feet that extend radially outward from the center portion.

2. The fire pit table apparatus of claim 1, wherein the vertical support member has an adjustable height so as to permit a height of the table top and the hot top be adjustable.

3. The fire pit table apparatus of claim 2, wherein the vertical support member has a lock mechanism to permit the vertical support member to be locked in a selected height.

4. The fire pit table apparatus of claim 2, wherein the vertical support member includes an inner housing and an outer housing that is disposed about the inner housing, the outer housing being slidable along a length of the inner housing, thereby permitting the height of the vertical support member to be varied.

5. The fire pit table apparatus of claim 4, wherein one of the inner housing and outer housing includes a pin and the other of the inner housing and outer housing includes a groove structure that receives the pin, the groove structure defining a plurality of different height positions for the vertical support member, wherein the vertical support member is locked in one height position when the pin is received in a select portion of the groove structure that corresponds to the selected height position.

6. The fire pit table apparatus of claim 1, wherein an upper surface of the hot top and an upper surface of the table top are flush.

7. The fire pit table apparatus of claim 1, wherein the table assembly includes a table support member that supports the table top, the table support member including a base member that mates with the base and is supported thereby, the table support member including a top wall on which the table top is supported and a plurality of struts that connect the base member and the top wall.

8. The fire pit table apparatus of claim 7, wherein the struts are oriented at angles relative to the base member and the top wall and the base member includes a hollow boss that receives a shaft associated with the fire pit assembly, the fire pit assembly being rotatable about an axis defined by the shaft.

9. The fire pit table apparatus of claim 7, further including a safety shield coupled to the struts for shielding a user from heat generated within the fire bowl.

10. The fire pit table apparatus of claim 9, wherein the safety shield comprises a plurality of separate shield parts, each shield part defined by a pair of angled panels that intersect along a line.

11. The fire pit table apparatus of claim 1, the table top has an annular shape and the hot top has an annular shape with the table top surrounding the hot top and the fire bowl of the fire bowl assembly is disposed within a central opening of the table top.

12. The fire pit table apparatus of claim 1, further including a burner assembly and a gas source that is connected to the burner assembly for providing fuel thereto, the burner assembly includes a burner that is disposed within the fire bowl, the burner being stationary relative to the rotating fire bowl.

13. The fire pit table apparatus of claim 12, wherein the gas source comprises a gas tank disposed within the base and the burner assembly include a gas supply conduit that is routed through a hollow shaft about which the fire bowl assembly rotates, the gas 14. A fire pit table apparatus comprising:
a base including a ground contacting portion;
a table assembly coupled to the base, the table assembly including a table top for placement of one or more objects, the table top having an opening formed therein; and
a fire bowl assembly that is disposed within the opening of the table top such that the table top surrounds at least a portion of the fire bowl assembly and provides access to the fire bowl assembly, the fire bowl assembly including a fire bowl and a hot top member that is disposed around the fire bowl, the hot top member including a planar surface on which one or more objects can be placed, wherein the fire bowl and the hot top member are rotatably coupled to the table assembly to permit rotation of the fire bowl assembly relative to the table assembly, wherein the fire bowl is coupled to the hot top by a plurality of heat transfer members, the heat transfer members contacting a plurality of discrete regions of the hot top that are heated by heat transferred from the fire bowl to the discrete regions.

15. The fire pit table apparatus of claim 14, wherein the discrete regions are formed of a conductive material and are separated from one another by a region formed of a non-conductive region.

16. The fire pit table apparatus of claim 14, wherein the heat transfer members comprise tubular structures with air inlet slots formed in bottom ends thereof proximate the fire bowl, whereby heating of the discrete regions occurs through thermal conduction and convection.

17. The fire pit table apparatus of claim 14, further including a bowl mount which receives and is coupled to a bottom of the fire bowl, the bowl mount including a shaft that is received within the table assembly and about which the fire bowl assembly rotates, wherein the hot top, fire bowl, heat transfer members and the bowl mount define a first subassembly that rotates as a unitary structure relative to the table assembly. supply conduit being sealingly connected to a gas supply hose that is connected to the gas tank.

18. A fire pit table apparatus comprising:
a base including a ground contacting portion;
a table assembly coupled to the base, the table assembly including a table top for placement of one or more objects, the table top having an opening formed therein;
a fire bowl assembly that is disposed within the opening of the table top such that the table top surrounds at least a portion of the fire bowl assembly and provides access to the fire bowl assembly, the fire bowl assembly including a main fire bowl and a hot top member that is disposed around the main fire bowl, the hot top member including a planar surface on which one or more objects can be placed, wherein the main fire bowl and the hot top member are rotatably coupled to the table assembly to permit rotation of the fire bowl assembly relative to the table assembly;
a burner assembly and a gas source that is connected to the burner assembly for providing fuel thereto, the burner assembly includes a burner that is disposed within the main fire bowl, the burner being stationary relative to the rotating main fire bowl; and
a second fire bowl that is disposed and supported within the main fire bowl for receiving a combustible material for burning thereof, the second fire bowl rotating with the main fire bowl and being disposed above the burner.

\* \* \* \* \*